Oct. 14, 1952      J. J. PRENDERGAST      2,613,498
OIL SEPARATION AND RECLAIMING MEANS FOR GAS TURBINE POWER PLANTS
Filed Oct. 25, 1949
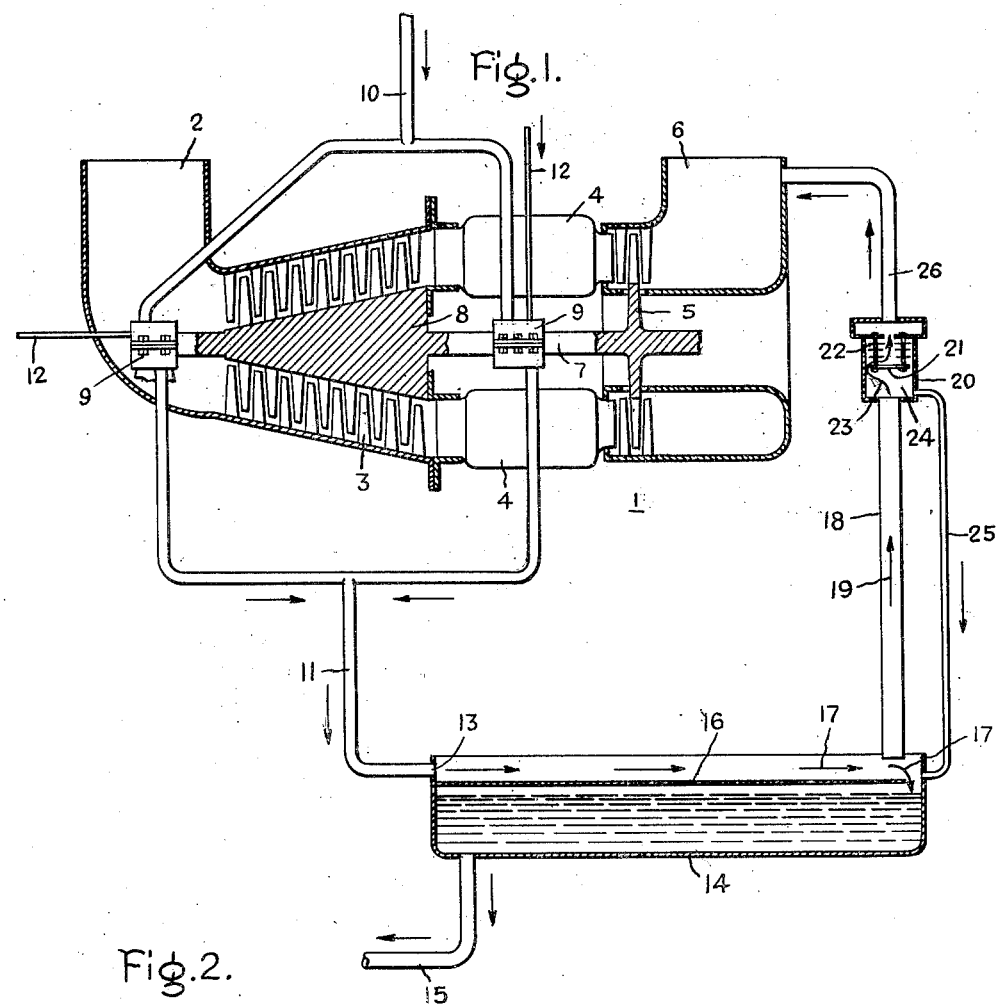
Inventor:
James J. Prendergast,
by Ernest C. Britton
His Attorney.

Patented Oct. 14, 1952

2,613,498

UNITED STATES PATENT OFFICE 2,613,498

OIL SEPARATION AND RECLAIMING MEANS FOR GAS TURBINE POWER PLANTS

James J. Prendergast, Erie, Pa., assignor to General Electric Company, a corporation of New York Application October 25, 1949, Serial No. 123,390

1 Claim. (Cl. 60—39.08)

This invention relates to means for separating and reclaiming entrained oil from oil tank vent lines and more particularly to such means utilized in connection with a lubricating oil storage tank for combustion apparatus such as a gas turbine.

In the design of certain combustion apparatus, such as gas turbines, in which a lubricating oil circulating system is utilized, it may be desirable to apply high pressure air seals on the bearings. Since the air pressure may be higher than the lubricating oil pressure, a greater volume of air may be discharged with the spent oil leaving the bearings than in conventional lubricating oil systems. It is, therefore, necessary to provide means for releasing this air from the spent lubricating oil. However, it has been found that a certain amount of the lubricating oil is entrained in the released air in the form of minute particles and in the vapor state. This oil is lost if the released air is discharged to the atmosphere. Therefore, it is also desirable to provide means for separating the entrained oil from the released air and for returning this oil to the system. Furthermore, since all of the vaporized oil is not separated, it is also desirable to discharge the released air into the combustion apparatus exhaust so that the remaining oil is burned and does not condense and otherwise collect on apparatus in close proximity.

An object of this invention is to provide an improved oil supply system in which oil entrained in vent air is separated and reclaimed.

Another object of this invention is to provide an improved oil supply system for combustion apparatus wherein oil entrained in vent air is separated and reclaimed and in which the vaporized oil which is not separated is burned in the exhaust of the combustion apparatus.

A further object of this invention is to provide an improved oil supply system wherein air discharged with the oil is released and entrained oil contained in the released air is separated and reclaimed.

Further objects and advantages of this invention will become apparent and the invention will be better understood from the following description referring to the accompanying drawing, and the features of novelty which characterize the invention will be pointed out with particularity in the claim annexed to and forming part of this specification.

In the drawing, Fig. 1 illustrates schematically a lubricating oil supply system for a gas turbine incorporating the improved entrained oil separation and reclaiming means of this invention; and Fig. 2 is a fragmentary illustration of a modification of this invention.

Referring now to Fig. 1, there is shown a gas turbine generally identified as 1 having an air inlet 2, a compressor 3 for compressing the air drawn into the inlet 2, combustion chambers 4 in which fuel is burned, and turbine wheel 5 through which the hot gases are expanded and which drives the compressor and provides the power output of the machine. The hot gas discharged from the turbine wheel 5 is discharged to the atmosphere by exhaust 6.

The rotatable shaft 7 which carries the rotatable element 8 of the compressor 3 and the turbine wheel 5, may be rotatably supported by two suitable bearings 9. Lubricating oil is brought to these bearings from the lubricating oil circulating pump (not shown) by lubricating oil line 10 and the spent oil is discharged from the bearings into oil line 11. High pressure air seals are provided for the bearings 9 and are supplied by an external source of high pressure air (also not shown) to air lines 12. The spent oil line 11 is connected to inlet 13 of oil storage tank 14 which in turn is connected to the lubricating oil circulating pump by a line 15.

Since the air pressure in the air lines 12 may exceed the oil pressure in the bearings 9, a large volume of bearing seal air may be ejected from the bearings with the spent oil entering the oil storage tank 14. Therefore, a horizontal baffle member 16 is arranged in the oil storage tank 14 above the normal oil level and extending entirely across the width and substantially across the length of the tank. The oil inlet 13 is arranged over the baffle member 16 so that the oil entering the tank must flow over the baffle, as shown by the arrow 17. Since the baffle member 16 extends across the entire width of the tank, the oil covers it in a comparatively thin film releasing the discharged air. To remove this air, a vent line 18 is provided arranged over the baffle member 16. The released air is conducted away by the vent line 18 as shown by the arrow 19.

It has been found, however, that some of the oil is entrained in the released air 19 and to separate and reclaim this oil, the arrangement now to be described is provided. An enlarged section 20 is inserted in the vent line 18 and an arrangement for insuring a rapid 90° change in direction of air flow in the form of a circular baffle member 21 is positioned in this enlarged section. The circular baffle member 21 provides a reduction in the area of the vent line and a plurality of washershaped baffle members 22 are arranged above the baffle member 21 to effect acceleration of air flow and an accelerated change in the direction of air flow as shown by the arrow 23. The entrained oil which is thrown out by and during the change of air direction is collected in cavity 24 at the bottom of the enlarged section 20 formed by the wall and bottom thereof and the vent line 18 which projects into the enlarged section 20. This separated oil is returned to the oil storage tank 14 by an oil return line 25. Some of the vaporized oil may not be separated, however, and, therefore, the end of the vent line 26 beyond the enlarged section 20 is terminated in the turbine exhaust 6 so that the unseparated vaporized oil is burned in the exhaust. The baffles 21 and 22 not only provide for separation of the vaporized oil, but also serve as a flame arrestor to prevent ignition of the vaporized oil and possible flash-back in the vent line 18 to the oil tank 14.

Referring now to Fig. 2 in which like elements are indicated by like reference numerals, there is shown a modification of this invention wherein a cylindrical screen 27 is positioned in the enlarged section 20 of the vent line 18. Baffle 28 is arranged on top of the cylindrical screen 27 and is spaced from the walls of the enlarged section 20. As can be readily seen, the air flow, as shown by the arrow 23, is identical with that shown in Fig. 1.

It will now be readily apparent that this invention provides an improved oil supply system for combustion apparatus wherein discharged bearing seal air is released and entrained oil contained in the released air is separated and reclaimed, vaporized oil which is not separated being burned in the exhaust of the combustion apparatus.

While I have illustrated and described a particular embodiment of this invention, modifications thereof will occur to those skilled in the art. I desire it to be understood, therefore, that this invention is not to be limited to the particular arrangements disclosed, and I intend in the appended claim to cover all modifications which do not depart from the spirit and scope of the invention.

What I claim as new and desire to secure by Letters Patent of the United States is:

In combination, a gas turbine power plant having bearings of the high pressure air-sealed type for the rotatable elements thereof, an air line for supplying high pressure air to said bearings, an oil feed line for supplying oil to said bearings, an oil storage tank having a baffle member positioned therein over the normal oil level and extending substantially across said tank, an oil discharge line connecting said bearings and said tank, said oil discharge line communicating with said tank over said baffle so that oil entering said tank flows over said baffle releasing air entrained therein, a vent line communicating with said tank over said baffle for removing said released air, oil separating means in said vent line arranged to restrict the area thereof and to change the direction of air flow therein whereby oil still entrained in said air is separated, and a drain line connecting said oil separating means and said tank for returning said separated oil thereto, said vent line terminating in the exhaust of said turbine whereby vaporized oil which has not been separated from said air is burned.

JAMES J. PRENDERGAST.

REFERENCES CITED

The following references are of record in the file of this patent:

UNITED STATES PATENTS

| Number | Name | Date |
|---|---|---|
| 1,769,502 | Cuno | July 1, 1930 |
| 1,782,783 | Kotzebue | Nov. 25, 1930 |
| 1,793,460 | Binkley | Feb. 24, 1931 |
| 1,839,379 | Downing | Jan. 5, 1932 |
| 2,020,250 | Stephens et al. | Nov. 5, 1935 |
| 2,082,863 | Weisgerber | June 8, 1937 |
| 2,230,278 | Walton | Feb. 4, 1941 |
| 2,296,543 | Steen et al. | Sept. 22, 1942 |
| 2,493,617 | Chubbuck | Jan. 3, 1950 |
| 2,570,171 | Van Kohorn et al. | Oct. 2, 1951 |